US008745370B2

(12) United States Patent
Chaves et al.

(10) Patent No.: US 8,745,370 B2
(45) Date of Patent: Jun. 3, 2014

(54) SECURE SHARING OF DATA ALONG SUPPLY CHAINS

(75) Inventors: Leonardo Weiss F. Chaves, Karlsruhe (DE); Benjamin Bolland, Karlsruhe (DE); Christian Loes, Kraichtal (DE); Hannes Thies, Heikendorf (DE); Pascal Wichmann, Oldenburg (DE)

(73) Assignee: SAP AG, Walldorf (DE)

( * ) Notice: Subject to any disclaimer, the term of this patent is extended or adjusted under 35 U.S.C. 154(b) by 553 days.

(21) Appl. No.: 12/824,427

(22) Filed: Jun. 28, 2010

(65) Prior Publication Data

US 2011/0320805 A1 Dec. 29, 2011

(51) Int. Cl.
*H04L 29/06* (2006.01)

(52) U.S. Cl.
USPC ............................ 713/150; 380/259; 380/283

(58) Field of Classification Search
CPC .................................................... H04L 9/3234
USPC ................... 713/150; 380/283, 259
See application file for complete search history.

(56) References Cited

U.S. PATENT DOCUMENTS

| | | | |
|---|---|---|---|
| 7,246,744 B2 * | 7/2007 | O'Brien et al. ................ 235/382 |
| 7,312,707 B1 * | 12/2007 | Bishop et al. .............. 340/572.1 |
| 7,492,258 B1 * | 2/2009 | Shoarinejad et al. ....... 340/572.1 |
| 7,503,480 B2 * | 3/2009 | Barnes et al. .................. 235/377 |
| 7,548,152 B2 * | 6/2009 | Hillier .......................... 340/5.61 |
| 7,606,557 B2 * | 10/2009 | Park et al. ..................... 455/410 |
| 7,661,132 B2 * | 2/2010 | Ohkubo et al. ................. 726/18 |
| 7,668,750 B2 * | 2/2010 | Bonalle et al. .................. 705/16 |
| 7,672,662 B2 * | 3/2010 | Hamberg ....................... 455/411 |
| 7,694,876 B2 * | 4/2010 | Barnes et al. ................. 235/377 |
| 7,705,732 B2 * | 4/2010 | Bishop et al. .............. 340/572.1 |
| 7,735,725 B1 * | 6/2010 | Bishop et al. ................. 235/380 |
| 7,810,726 B2 * | 10/2010 | de la Huerga ................ 235/385 |
| 7,831,238 B2 * | 11/2010 | Hamberg ....................... 455/411 |
| 7,913,093 B2 * | 3/2011 | Ishigaki et al. ............... 713/189 |
| 7,925,535 B2 * | 4/2011 | Beenau et al. ................. 705/16 |
| 7,940,179 B2 * | 5/2011 | Burbridge et al. ......... 340/572.1 |
| 8,009,017 B2 * | 8/2011 | Park et al. ..................... 340/10.1 |
| 8,049,594 B1 * | 11/2011 | Baranowski ................. 340/5.61 |
| 8,055,898 B2 * | 11/2011 | Yamamura ................... 713/168 |
| 8,066,181 B2 * | 11/2011 | Bishop et al. ................. 235/380 |
| 8,103,872 B2 * | 1/2012 | O'Brien et al. ............... 713/168 |
| 8,174,369 B2 * | 5/2012 | Jones et al. ................. 340/10.52 |
| 8,176,323 B2 * | 5/2012 | Anemikos et al. ........... 713/168 |
| 8,242,892 B2 * | 8/2012 | Griffin ........................ 340/10.41 |
| 8,264,321 B2 * | 9/2012 | Baranowski ................. 340/5.61 |
| 8,344,853 B1 * | 1/2013 | Warner et al. ................ 340/10.1 |
| 2003/0051146 A1 * | 3/2003 | Ebina et al. ................... 713/185 |
| 2005/0033619 A1 * | 2/2005 | Barnes et al. ..................... 705/7 |

(Continued)

*Primary Examiner* — David García Cervetti
(74) *Attorney, Agent, or Firm* — Fish & Richardson P.C.

(57) ABSTRACT

Implementations of methods of sharing data in a supply chain, the data corresponding to an item having a tag associated therewith, include generating data corresponding to the item, generating a data reference, encrypting the data using an encryption key to provide encrypted data, transmitting the encrypted data over a network for storage in a database based on the data reference, writing the data reference and the encryption key to the tag, and transferring the item to a successor in the supply chain. Implementations include retrieving information electronically stored on the tag, the information comprising a data reference and an encryption key, transmitting a data request over a network for retrieving encrypted data from a database, the data request comprising the data reference, receiving the encrypted data from the database, and decrypting the encrypted data using the encryption key to provide decrypted data.

18 Claims, 8 Drawing Sheets

(56) References Cited

U.S. PATENT DOCUMENTS

| | | | |
|---|---|---|---|
| 2005/0038718 A1* | 2/2005 | Barnes et al. | 705/28 |
| 2005/0060233 A1* | 3/2005 | Bonalle et al. | 705/16 |
| 2005/0113066 A1* | 5/2005 | Hamberg | 455/411 |
| 2005/0160138 A1* | 7/2005 | Ishidoshiro | 709/203 |
| 2005/0248455 A1* | 11/2005 | Pope et al. | 340/539.27 |
| 2006/0012473 A1* | 1/2006 | Bishop et al. | 340/539.1 |
| 2006/0032901 A1* | 2/2006 | Sugiyama et al. | 235/375 |
| 2006/0077034 A1* | 4/2006 | Hillier | 340/5.61 |
| 2006/0080732 A1* | 4/2006 | Ohkubo et al. | 726/9 |
| 2006/0174136 A1* | 8/2006 | Lyons et al. | 713/189 |
| 2006/0277061 A1* | 12/2006 | Revanur et al. | 705/1 |
| 2007/0106892 A1* | 5/2007 | Engberg | 713/168 |
| 2007/0109124 A1* | 5/2007 | Park et al. | 340/572.1 |
| 2007/0146141 A1* | 6/2007 | Popplewell et al. | 340/572.8 |
| 2007/0176744 A1* | 8/2007 | Park et al. | 340/10.1 |
| 2007/0194879 A1* | 8/2007 | Backes et al. | 340/5.8 |
| 2007/0198569 A1* | 8/2007 | Johnston | 707/102 |
| 2008/0042804 A1* | 2/2008 | Burbridge et al. | 340/10.1 |
| 2008/0061935 A1* | 3/2008 | Melendez et al. | 340/10.1 |
| 2008/0093448 A1* | 4/2008 | de la Huerga | 235/385 |
| 2008/0199011 A1* | 8/2008 | Tuyls et al. | 380/268 |
| 2008/0320306 A1* | 12/2008 | Yamamura | 713/168 |
| 2009/0055259 A1* | 2/2009 | Lavoice | 705/14 |
| 2009/0091426 A1* | 4/2009 | Barnes et al. | 340/10.1 |
| 2009/0091451 A1* | 4/2009 | Jones et al. | 340/572.1 |
| 2009/0153302 A1* | 6/2009 | Barnes et al. | 340/10.1 |
| 2009/0175445 A1* | 7/2009 | Shin et al. | 380/201 |
| 2009/0214037 A1* | 8/2009 | Tuttle | 380/270 |
| 2009/0214038 A1* | 8/2009 | Wong et al. | 380/270 |
| 2009/0315686 A1* | 12/2009 | Oberle | 340/10.52 |
| 2009/0323928 A1* | 12/2009 | Kerschbaum et al. | 380/28 |
| 2010/0007466 A1* | 1/2010 | Shoarinejad et al. | 340/10.1 |
| 2010/0011212 A1* | 1/2010 | Anemikos et al. | 713/171 |
| 2010/0017617 A1* | 1/2010 | Lee et al. | 713/185 |
| 2010/0045442 A1* | 2/2010 | Lu et al. | 340/10.3 |
| 2010/0127822 A1* | 5/2010 | Devadas | 340/5.8 |
| 2010/0155475 A1* | 6/2010 | Paek et al. | 235/439 |
| 2010/0161999 A1* | 6/2010 | Poovendran et al. | 713/189 |
| 2010/0172502 A1* | 7/2010 | Jones et al. | 380/277 |
| 2010/0194545 A1* | 8/2010 | Wong | 340/10.51 |
| 2010/0250930 A1* | 9/2010 | Csaszar et al. | 713/168 |
| 2010/0277287 A1* | 11/2010 | Choi et al. | 340/10.42 |
| 2010/0281030 A1* | 11/2010 | Kusumura et al. | 707/741 |
| 2010/0283614 A1* | 11/2010 | Soppera et al. | 340/572.4 |

* cited by examiner

SECURE SHARING OF DATA ALONG SUPPLY CHAINS

BACKGROUND

An enterprise uses a supply chain to transform and move a product or service from one or more suppliers (entities, partners or companies) to a customer in a manufacturing process. The supply chain is a system that can involve various organizations and people inside and outside of the enterprise. Additionally, the supply chain can utilize technologies, activities, and information to transform natural resources, raw materials and components from the one or more suppliers into a finished product that can be delivered to customer.

As the product makes its way through the supply chain, the enterprise may move the product between various suppliers. The suppliers can share product related data along the supply chain. However, the suppliers may want maintain the confidentiality of information related to the product movement and transformation as the enterprise moves the product between suppliers. This is particularly relevant in an ad hoc supply chain with dynamically changing suppliers. The enterprise can determine the trade-off between the need to share information along the supply chain and the non-proliferation of confidential information to competitors or others outside of the supply chain. Sharing information between suppliers along the supply chain can result in each supplier providing additional services that benefit the manufacture of the product. The sharing of information can also result in manufacturing process optimizations and improvements resulting in reduced manufacturing costs.

SUMMARY

Implementations of the present disclosure include methods of sharing data in a supply chain, the data corresponding to an item having a tag associated therewith. In some implementations, a method includes generating data corresponding to the item, generating a data reference, encrypting the data using an encryption key to provide encrypted data, transmitting the encrypted data over a network for storage in a database based on the data reference, writing the data reference and the encryption key to the tag, and transferring the item to a successor in the supply chain.

In some implementations, generating a data reference includes linking the encryption key and a tag ID using a reference function. In some implementations, generating a data reference further includes linking a timestamp with the encryption key and the tag ID.

In some implementations, the method further includes accessing encrypted data stored in the database, and decrypting the encrypted data using a decryption key. In some implementations, the encryption key is the same as the decryption key.

In some implementations, writing includes replacing a previous encryption key with the encryption key.

In some implementations, writing comprises replacing a previous data reference with the data reference.

In some implementations, the method further includes receiving the item from a predecessor in the supply chain, retrieving information electronically stored on the tag, the information comprising a previous data reference and a previous encryption key, transmitting a data request over the network for retrieving previous encrypted data from a database, the data request comprising the previous data reference, receiving the previous encrypted data from the database, and decrypting the previous encrypted data using the previous encryption key to provide decrypted data.

In some implementations, a method of sharing data in a supply chain, the data corresponding to an item having a tag associated therewith, includes retrieving information electronically stored on the tag, the information comprising a data reference and an encryption key, transmitting a data request over a network for retrieving encrypted data from a database, the data request comprising the data reference, receiving the encrypted data from the database, and decrypting the encrypted data using the encryption key to provide decrypted data.

In some implementations, the method further includes generating additional data corresponding to the item, appending the additional data to the decrypted data to provide updated data, generating a second data reference, encrypting the updated data using a second encryption key to provide second encrypted data, transmitting the second encrypted data over the network for storage in the database based on the second data reference, writing the second data reference and the second encryption key to the tag, and transferring the item to a successor in the supply chain.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
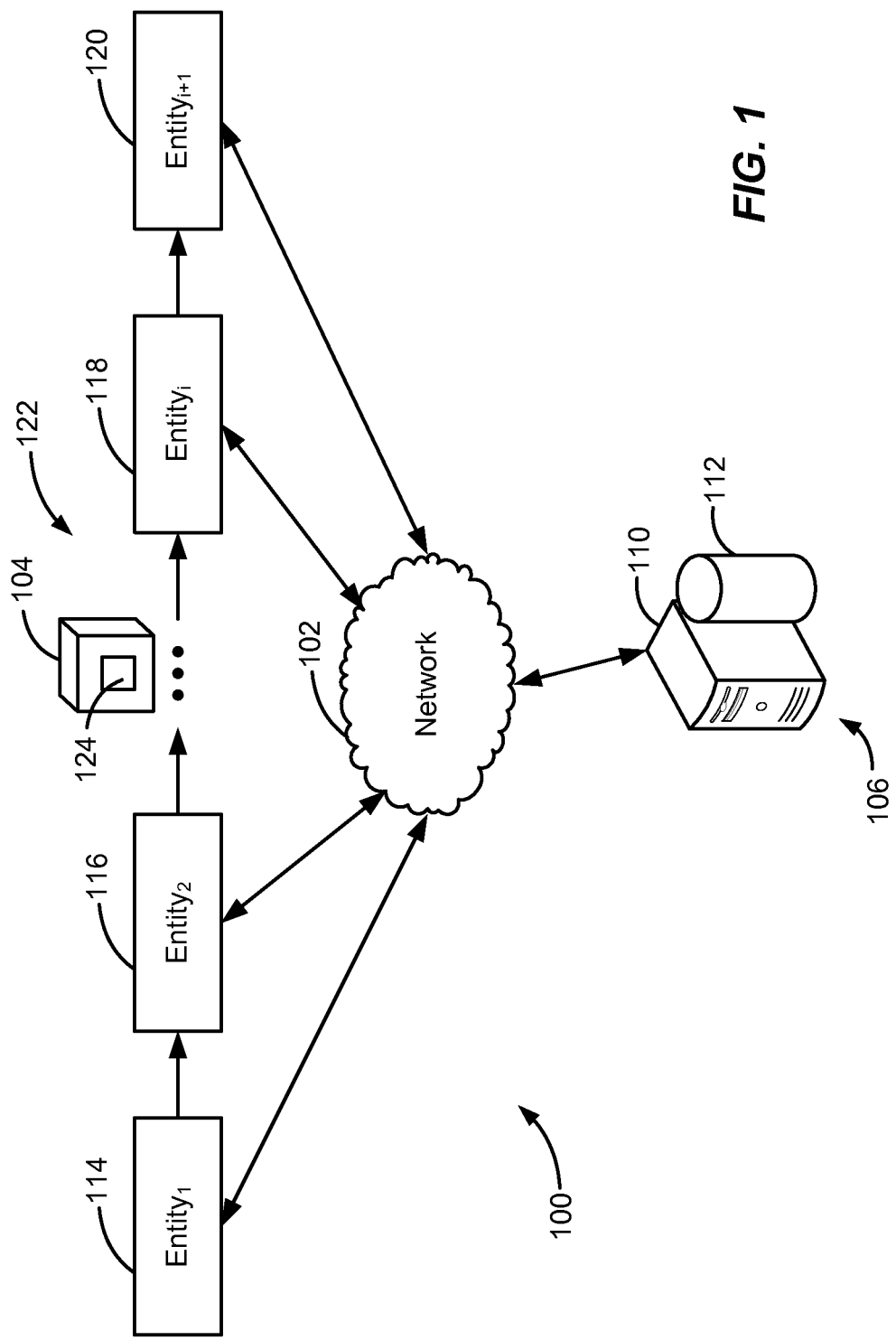
FIG. 1 is a block diagram of an example system architecture that can execute implementations of the present disclosure.

Implementations of the present disclosure are generally directed to enabling item level services through secure sharing of radio frequency identification (RFID) data along a supply chain. The RFID data can be stored on RFID tags, which include an integrated circuit (IC) to store the data and an antenna for wirelessly receiving and transmitting radio wave signals that can include the data. RFID tags can be attached to the various products used along the supply chain (e.g., natural resources, raw materials and components) to produce the assembled finished product. Additionally, RFID tags can be attached to the finished manufactured product.

In some implementations, RFID tags enable automatic identification of products. The characteristics of RFID, such as the automation of a read/write process, the bulk capture of data and the storage of detailed information in a small footprint enable enterprises to optimize their manufacturing processes and their internal supply chain systems. The use of RFID tags to identify products can increase the efficiency of the processing and utilization of product information between entities in a supply chain.

In some implementations, enterprises may not use RFID tags to share information between entities in a supply chain due to the risk of divulging critical information related to the supply chain process to unwanted third parties. The critical information can include information related to strategic partnerships among the entities, the general design of the product distribution channel, future strategic product and process restructurings, and penalties for unfair or inefficient behavior among the entities.

An enterprise can leverage the advantages of sharing RFID data between entities by sharing as little critical information as possible and by controlling who receives the critical information along the supply chain. In some implementations, data access can be restricted from one entity to its direct successor entity in a supply chain. In addition, the identities of participating entities in the supply chain can be protected. The enterprise can determine how much critical information to share along the supply chain by evaluating the trade-off between the amount of data sharing necessary to achieve manufacturing optimization and cost savings verses the potential proliferation of confidential information to competitors. The enterprise, in sharing RFID data along the supply chain, can maintain the confidentiality of the data, preventing its use by competitors. The enterprise can maintain the privacy of the data, protecting any information related to suppliers, employees and customers. The enterprise can keep the identity of participating entities in the supply chain process limited to designated partners. Additionally, the enterprise can insure the integrity and authenticity of the shared data.

In some implementations, the RFID tag can store a reference to a database entry, where the database stores the shared data. In this case, the RFID tag can be small and more cost effective, eliminating the need for RFID tags with tag-side cryptographic protection in order to protect sensitive shared data. Additionally, the service provider of the database can provide the enterprise with additional services such as data management and storage. In some implementations, the database can be a centralized database where each entity in the supply chain can have unrestricted access the database (e.g., using a database query) to retrieve the shared data. In some implementations, the database can be a decentralized or local database where the enterprise can control and manage access to the database (e.g., the enterprise can grant or restrict access to the database individually to each entity in the supply chain). In this case, each entity, in advance of any access to the database, would know the location of the database and the enterprise would provide each authorized entity a key or other type of access to the database. The need for prior knowledge by the entities in the supply chain when using a decentralized database for the storage of shared data can preclude the use of an ad hoc supply chain. In some implementations, the shared data stored in a centralized or decentralized database is encrypted requiring the knowledge of the encryption key by the entity to determine the shared data. In some implementations, the encryption key is included in the data on the RFID tag for the product.

As described, enterprises can benefit from enabling and facilitating data sharing among entities within a supply chain. In order to implement data sharing in a secure manner, the enterprise can provide a method of data sharing that prevents unauthorized access to data within the supply chain. For example, each entity in the supply chain is provided access only to current product data provided by its direct predecessor in the supply chain. Additionally, the current product data is stored on a database and not directly on the RFID tag, eliminating data access by unauthorized entities. The entity in possession of the product (with the attached RFID tag) can access the information stored on the RFID tag and subsequently the current product data.

In some implementations, historical data for a product includes data accumulated and passed on from partner to partner in a supply chain. The historical data can take unaltered previous product data and add new data without discriminating between the relevant information at the current or future stage of the manufacturing process and information that is no longer relevant to the manufacturing process that may be deleted. Sharing historical data among partners in a supply chain would allow all partners in the supply chain access to all the data for a product. An enterprise, in the case of an ad hoc supply chain, may not want all partners in the supply chain to have access to what may be critical data regarding the product.

In some implementations, a partner has access to shared data relevant to the product at the current stage and/or subsequent stages in the supply chain, which may include some non-critical historical data for the product. The shared data may be passed from one partner in the supply chain to the subsequent partner in the supply chain. Included with the data may be information related to the product that the enterprise considers non-critical (e.g., a product name, a description of the product, the product's material properties, product dimensions, color, storage instructions, etc.).

In some implementations, in order to protect the identity of participating entities in a supply chain, the identity of the predecessors in the supply chain or the overview of the complete supply chain may not be shared among the entities within the supply chain. The confidentiality of the identity of partners in the supply chain is then maintained.

In order to implement data sharing in a supply chain in a scalable and performance critical manner, the enterprise can use RFID tags on products to accumulate large amounts of data that can be stored separately from the RFID tag as previously described. The enterprise's method of data sharing can be scaled based on the amount of stored data and the number of entities in the supply chain. The scalability of the data sharing can be important in an ad hoc supply chain where the suppliers dynamically change during the manufacturing process. In an ad hoc supply chain, the enterprise can implement and maintain data sharing by integrating new partners in the supply chain without the need for prior registration with the enterprise and without the need for prior exchanges of keys or passwords between the enterprise and the new partner. Members of the supply chain may then dynamically enter and leave the supply chain process without previous data exchanges with the enterprise. Additionally, the requirements for both hardware and software for a partner to participate in the supply chain system can be kept at a minimum, for example, when the enterprise implements a standard RFID infrastructure (e.g., the EPCglobal industry standard for RFID support in an Electronic Product Code (EPC)).

FIG. 1 is a block diagram of an example system 100 that can execute implementations of the present disclosure. The system 100 enables n number of entities (examples of which are entities 114, 116, 118, 120) access, by way of a network 102, to a central computer 106 that includes a central database 112 and a central server 110.

In the example of FIG. 1, an entity (e.g., entities 114, 116, 118, 120) can be a company, partner, organization or supplier located in a supply chain 122. For example, entity 114 is located before entity 116 in the supply chain 122. Entity 118 is located before entity 120 in the supply chain 122. The supply chain 122 manufactures product 104. The product 104 along with any additional components can be introduced to each entity in the supply chain during the manufacturing process. In the example of FIG. 1, the finished product will be output by entity 120 for subsequent delivery to a customer.

In some implementations, the central computer 106 is located at an external service provider. Shared data among entities in the supply chain can be encrypted and stored in the central database 112. Each entity in the supply chain (the n entities in the supply chain 122) can outsource the shared data to the external service provider. In addition, the external service provider can manage access to the stored shared data.

In the example of FIG. 1, the supply chain 122 can be an ad hoc supply chain. Entities can share product related data along the supply chain 122 using RFID, where an RFID tag 124 is attached to the product 104.

Figure 2:
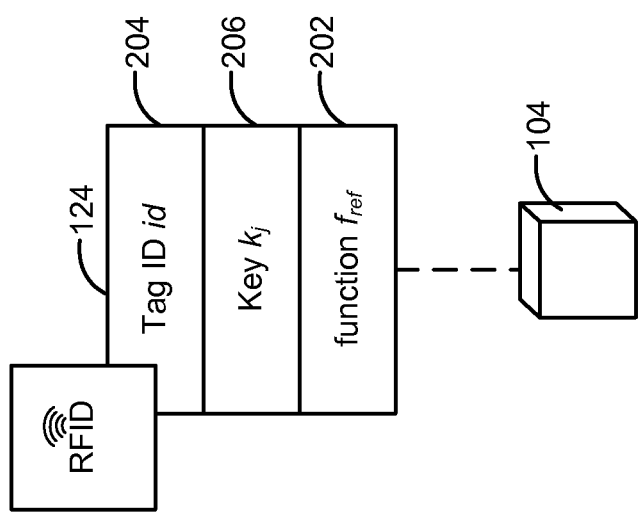
FIG. 2 is a diagram of example data included in an RFID tag.

FIG. 2 is a diagram of example data 200 included on the RFID tag 124. The RFID tag 124 can include a function $f_{ref}$ 202, which is used to generate a reference to shared data stored in the central database 112 of the central computer 106 in FIG. 1. The RFID tag 124 can include a unique tag identifier (ID) id 204 that remains unchanged throughout the supply chain. During a manufacturing process, data can be accumulated during each value added step in the supply chain. Each entity along the supply chain can store the data accumulated during the value added step performed by the entity in the supply chain. The entity can pass the accumulated data to the next entity in the supply chain.

For example, referring to FIGS. 1 and 2, the data $(data_j)$ accumulated during the value added manufacturing step (step j) performed by entity 114 (company$_i$) can be shared with the successor entity 116 (company$_{i+1}$). The entity 114 can encrypt the accumulated data using a key $k_j$ 206 producing encrypted accumulated data $(data_j)_{kj}$. The entity 114 can store the encrypted accumulated data on the central database 112 in order to share the data with the successor entity 116. The entity 114 can write the key $k_j$ 206 used to encrypt the accumulated data on the RFID tag 124. The successor entity 116 can read the RFID tag 124 and access the shared data on the central database 112. The successor entity 116 can use the key $k_j$ 206 to decrypt the shared data.

In some implementations, the entities know the endpoint of the database in order to access the stored data. For example, referring to FIG. 1, the n entities in the supply chain 122 know the endpoint of the central database 112 in order to access the data stored on the central database 112. If the endpoint does not change, it can be assumed public and known by each of the entities (e.g., a dedicated service). If the endpoint is dynamic (the endpoint changes), the information about the endpoint is shared prior to access by any of the n entities in the supply chain 122 to the central database 112. Alternatively, the information about the endpoint can be written to and read from the RFID tag 124.

Figure 3:
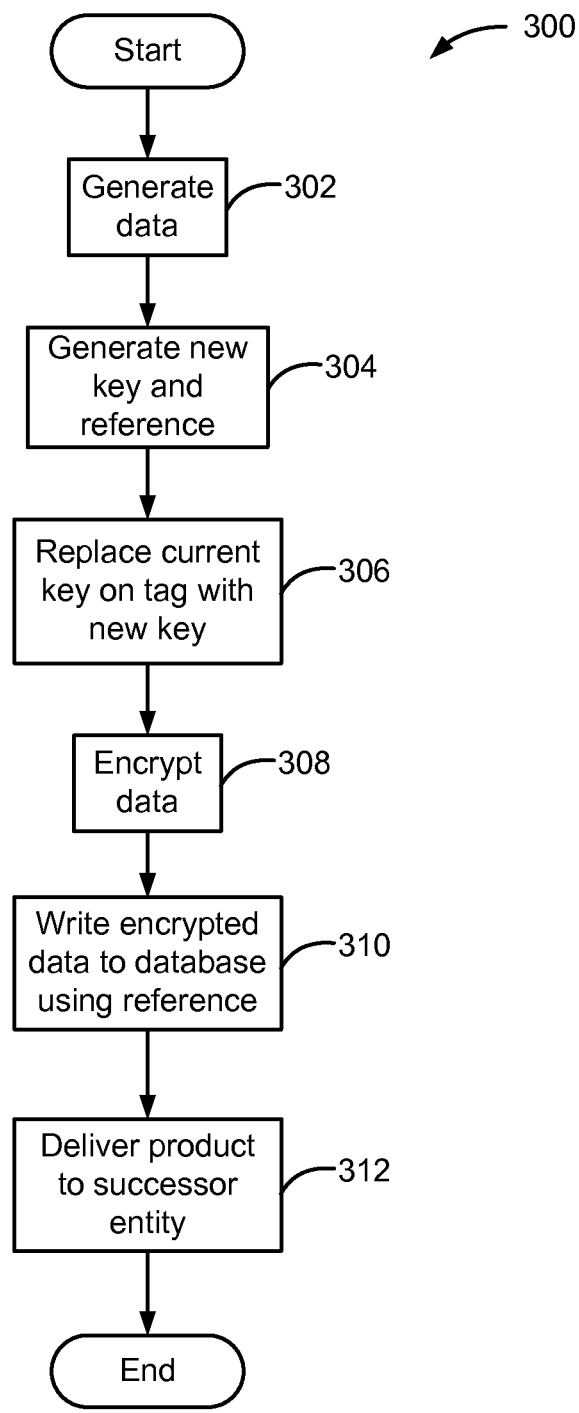
FIG. 3 is a flowchart illustrating example steps an entity can execute to store data in a database and write data to an RFID tag.

FIG. 3 is a flowchart illustrating example steps 300 an entity can execute to store data in a database and write data to an RFID tag. For example, referring to FIG. 1, the entity 114 (company$_i$) can execute the example steps 300 to store data $(data_j)$ accumulated during the value added manufacturing step performed by the entity 114 for the product 104. The entity 114 can store the accumulated data in the central database 112 and write additional data to the RFID tag 124.

The process starts when the entity performs a value added manufacturing step and generates data (302). The entity generates a new key and a new reference (304). For example, the entity generates a reference rowID using a function $f_{ref}$. The entity can use a large number as the key $k_j$ (e.g., the key $k_j$ can be a randomly generated number). The entity replaces the current key on the RFID tag attached to the product with the new key (306). The entity encrypts the data (308). For example, the entity encrypts the generated accumulated data $(data_j)$ using the new key $k_j$ and an encryption function $f_{enc}$. The entity writes the encrypted data to a database using the reference (310). For example, entity 114 accumulates and encrypts the data generated by the value added manufacturing step performed by the entity 114 and stores the encrypted data $(data_j)_{kj}$ in the central database 112 at the reference location generated. The entity delivers the product to the successor entity (312). For example, the entity 114 delivers the product 104 to the successor entity 116 (company$_{i+1}$).

Figure 4:
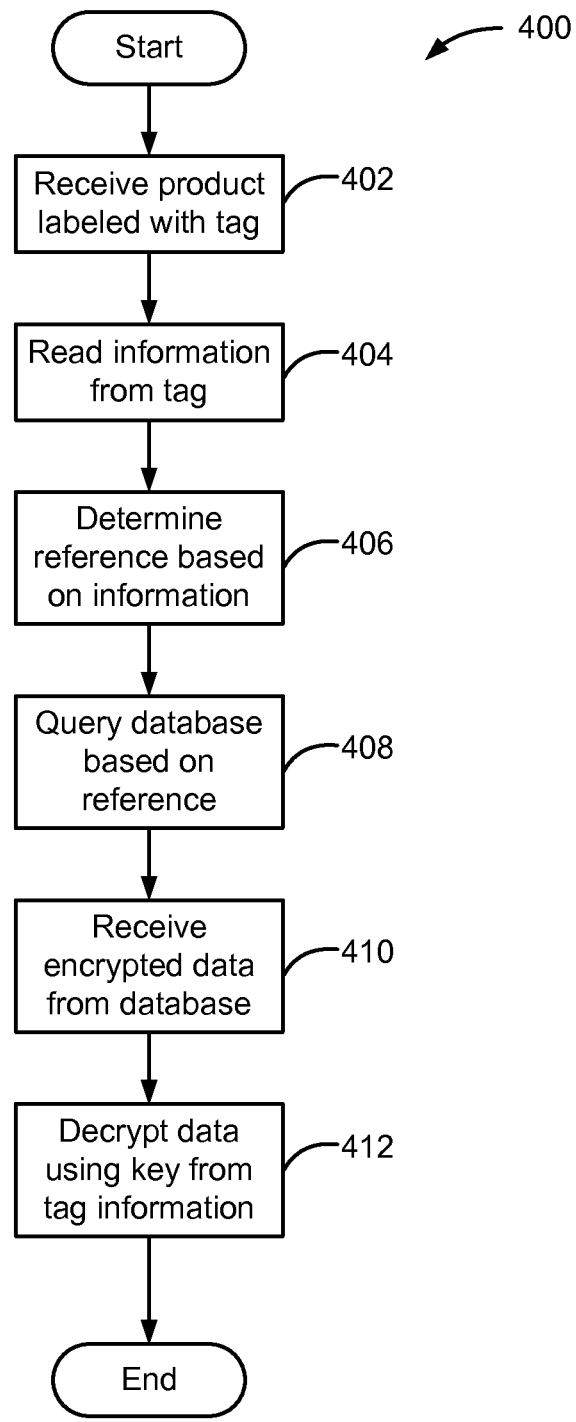
FIG. 4 is a flowchart illustrating example steps an entity can execute to access data from a database and read data from an RFID tag.

FIG. 4 is a flowchart illustrating example steps 400 an entity can execute to access data in a database and read data from an RFID tag. For example, referring to FIG. 1, the successor entity 116 (company$_{i+1}$) can execute the example steps 400 to access encrypted data $(data_j)_{kj}$ accumulated during the value added manufacturing step performed by the entity 114 for the product 104. The successor entity 116 can access the accumulated data in the central database 112 and read additional data from the RFID tag 124.

The process starts when the successor entity receives a product labeled with an RFID tag (402). For example, the successor entity 116 (company$_{i+j}$) can receive the product 104 that includes the attached RFID tag 124. The successor entity reads information from the RFID tag (404). For example, the successor entity 116 reads the key $k_j$ 206, the function $f_{ref}$ 202 and the unique tag identifier (ID) id 204 from the RFID tag 124. The successor entity determines the reference to the data based on the information read from the RFID tag (406). The entity queries the database based on the reference (408). The entity receives the encrypted data from the database (410). For example, the successor entity 116 determines the reference rowID that points to the location of the encrypted data $(data_j)_{kj}$ and then queries the central database 112 using the reference rowID to obtain the stored encrypted data $(data_j)_{kj}$. The successor entity decrypts the stored encrypted data using the key read from the RFID tag (412). For example, the successor entity 116 decrypts the encrypted data $(data_j)_{kj}$ using key $k_j$ 206 read from the RFID tag 124 in a function $f_{dec}$ resulting in decrypted data $(data_j)$.

In some implementations, entities use a symmetric cryptosystem to encrypt and decrypt data. In a symmetric cryptosystem, the encryption key e is equal to the decryption key d or the decryption key d is computed from the encryption key e. Therefore, the encryption key and the decryption key can be equal and represented by a single key $k_j$. The key $k_j$ can be generated and shared between entities in a supply chain by writing and reading the key $k_j$ from the RFID tag.

In some implementations, key generation can involve one or more parameters that can be static or dynamically generated. For example, a key is generated using one parameter (e.g., a random number). In another example, a key is generated using multiple parameters where the parameters are combined to form the key. The combination of the parameters can be concatenations of the parameters or the parameters can be combined using computations. In some implementations, static parameters used for key generation are generated once before the start of the first data exchange between entities in the supply chain. In some implementations, dynamic parameters used for key generation are generated exclusively for a single data exchange (e.g., a random number for a data exchange between two entities).

The generated key can be used as an input to the encryption function $f_{enc}$ and the decryption function $f_{dec}$. The generated key should meet security requirements such that an entity in possession of the key cannot the identity of the companies involved in the supply chain or the number of steps included in the supply chain. For example, existing prime numbers with the resulting multiplicative product can form the key. In another example, an entity, before each data exchange between entities can generate a new random number for use as a key.

An entity can use an encryption function $f_{enc}$ to encrypt $data_j$. For example, $(data_j)_{kj} = f_{enc}(data_j; k_j)$. An entity can use a decryption function $f_{dec}$ to decrypt the encrypted data $(data_j)_{kj}$. For example, $data_j = f_{dec}((data_j)_{kj}; k_j)$. The encryption function $f_{enc}$ and the decryption function $f_{dec}$ should be compatible to allow encrypted data by one entity to be decrypted by a successor entity. For example, $data_j = f_{dec}(f_{enc}(data_j; k_j); k_j)$. Additionally, the encryption function $f_{enc}$ and the decryption function $f_{dec}$ should meet security requirements of encryption and decryption functions. For example, a third party should not be able to determine $data_j$ from the encrypted data $(data_j)_{kj}$ without knowledge of the decryption function $f_{dec}$ and the key $k_j$. For example, the encryption function $f_{enc}$ and the decryption function $f_{dec}$ can be bitwise exclusive OR (XOR) functions.

In some implementations, entities use an asymmetric cryptosystem (a public key cryptosystem) to encrypt and decrypt data. In an asymmetric cryptosystem, the encryption key e is distinct from the decryption key d where the decryption key d may not be computed from the encryption key e. An entity can make the encryption key e a public key. The entity can make the decryption key d a private key, known only to the entity itself. For example, an entity ($company_i$) can have a public encryption key $e = k_{i,public}$ and a private decryption key $d = k_{i,private}$.

The public and private keys can be used as an input to the encryption function $f_{enc}$ and the decryption function $f_{dec}$, respectively. For example, referring to FIG. 1, entity 114 ($company_i$) uses the public key of its successor entity 116 ($company_{i+1}$) to encrypt accumulated shared data $(data_j)$ of the entity 114, where $(data_j)_{ki+1,public} = f_{enc}(data_j; k_{i+1,public})$. The successor entity 116 ($company_{i+1}$) uses its private key $k_{i+1,private}$ to decrypt the encrypted data $(data_j)_{ki+1,public}$, where $data_j = f_{dec}((data_j)_{ki+1,public}; k_{i+1,private})$. When using an asymmetric cryptosystem, the entity may not write a key value on the RFID tag as the public encryption key, $k_{i,public}$, is publically available and each entity knows its own the private decryption key, $k_{i,private}$. Prior to the first data exchange, each company generates a pair of encryption/decryption keys (e.g., $k_{i,public}$, $k_{i,private}$) and distributes its public key to the supply chain entities. In the case of ad hoc supply chains, public key distribution can be problematic and the use of private keys can complicate data exchanges.

In some implementations, entities use a combination of a symmetric and an asymmetric cryptosystem (a hybrid cryptosystem) to encrypt and decrypt data. A hybrid cryptosystem can use asymmetric keys (e.g., $k_{i,public}$, $k_{i,private}$) to exchange a symmetric key $k_j$, which is used for the encryption and decryption of data. For example, an entity ($company_i$) encrypts the accumulated shared data $(data_j)$ with the symmetric key $k_j$, which is encrypted using the entity's public key $k_{i,public}$. Additionally, the entity encrypts data stored on the RFID tag (e.g., the reference rowID and the symmetric key $k_j$) with the public key $k_{i+1,public}$ of the successor entity ($company_{i+1}$) and writes the encrypted data to the RFID tag prior to handing the product over to the successor entity. Once received, the successor entity decrypts the data stored on the RFID tag using its private key $k_{i+1,private}$. In the case of ad hoc supply chains, the use of a hybrid cryptosystem using an asymmetric cryptosystem to cipher a symmetric key can be problematic. The use of private keys can complicate data exchanges in an ad hoc supply chain.

In some implementations, in order for an entity to share data with a successor entity, the entity accumulates the data generated by the value added manufacturing step performed by the entity. The entity can encrypt the accumulated data and store it in a database. The entity generates a reference that points to the location of the accumulated shared data on the database and passes that reference to its successor entity. The successor entity, having access to the same database, accesses the database using the reference provided by the entity to obtain the shared data. For example, referring to FIG. 1, the entity 114 encrypts accumulated data and stores the data in the central database 112. The successor entity 116 has access to the central database 112. The entity 114 writes a reference on the RFID tag 124 attached to product 104. The entity 114, upon completion of its value added manufacturing step, hands off the product 104 to successor entity 116. Successor entity 116 reads the reference on the RFID tag and uses the reference to point to the data stored on the central database 112. The successor entity 116, having access rights to the central database 112, can read the shared data provided by the entity 114. In some implementations, the database can be a relational database where tables in the database are linked together using primary keys. In some implementations, the database can be a flat database consisting of a single table used to store the data.

An entity can generate a unique reference that satisfies one or more criteria. For example, a successor entity may not determine the tag ID or the identity of other entities in the supply chain from the reference. The successor entity can determine the reference without the use of computationally intensive and time-consuming calculations. The reference should utilize a minimum amount of storage space on the RFID tag enabling the use of smaller, more cost effective RFID tags. Additionally, each reference should be unique, where the probability of generating two equal references can be kept to a minimum.

An entity can generate a reference based on one or more parameters. For example, the entity can use the unique tag ID for the product in generating a unique reference. The use of the tag ID alone is not sufficient for generating a unique reference for each data exchange for the product. For example, the entity can use the tag ID in combination with a consecutive number to generate the reference. This enables the selection of a unique number for each data exchange that can then be combined with the tag ID for the product to form the reference. Entities along the supply chain may deduce prior and future references based on this combination. Additionally, an external service provider may determine the data associated with a specific tag ID when this combination is used.

In another example, the entity can combine the unique tag ID for the product with a symmetric key and link the tag ID and the symmetric key together using the function $f_{ref}$ to generate the reference. In this example, there is an increased probability that two references may be equal. To minimize this probability, the entity can further combine a timestamp with the tag ID and the symmetric key and link the three parameters together using the function $f_{ref}$. For example, if the service provider determines a generated reference is not unique, the service provider can signal an error and request the entity generate another reference. In doing so, the entity will use a new timestamp to generate the new reference reducing the probability of the new reference being equal to an existing reference.

In some implementations, the entity can explicitly store the reference on the RFID tag for use by the successor entity. In some implementations, the entity can store on the RFID tag the parameters needed and the function used to derive the reference. For example, the entity can store on the RFID tag the tag ID, the symmetric key, the timestamp and the function $f_{ref}$ (or a pointer to the function $f_{ref}$ which could be stored, for example, on the database with the shared data). The successor entity can read the information stored on the RFID tag and use the information along with the function $f_{ref}$ to generate the reference. In some implementations, when using an asymmetric cryptosystem, a public key can be used in place of the symmetric key to generate a reference.

The entities (e.g., the n entities in the supply chain 122 shown in FIG. 1) may need to know in advance the specifications of the functions of the cryptosystem (e.g., function $f_{dec}$, function $f_{enc}$, and function $f_{ref}$). In some implementations, the function specifications can be shared with the entities prior to their use in the supply chain. This may be difficult when using an ad hoc supply chain. In some implementations, the RFID tag can include the function specifications (or references to the function specifications) in order for the function specifications to be shared among the entities in the supply chain without the need for prior knowledge of the function specifications. In some implementations, the functions can be explicitly stored on the RFID tag. In some implementations, the functions can be implicitly stored on the RFID tag. For example, the parameters needed for the functions and references to the functions can be stored on the RFID tag, where the functions may be stored in an internal or external database.

In some implementations, the function $f_{ref}$ is a non-invertible ("one-way") function similar to a hash function, where the input cannot be deduced from a given output of the function. The function $f_{ref}$ generates a reference rowID$_j$ given a tag ID id, symmetric key $k_j$, and a timestamp t as inputs. For example, rowID$_j$=$f_{ref}$(id; $k_j$; t).

Figure 5A:
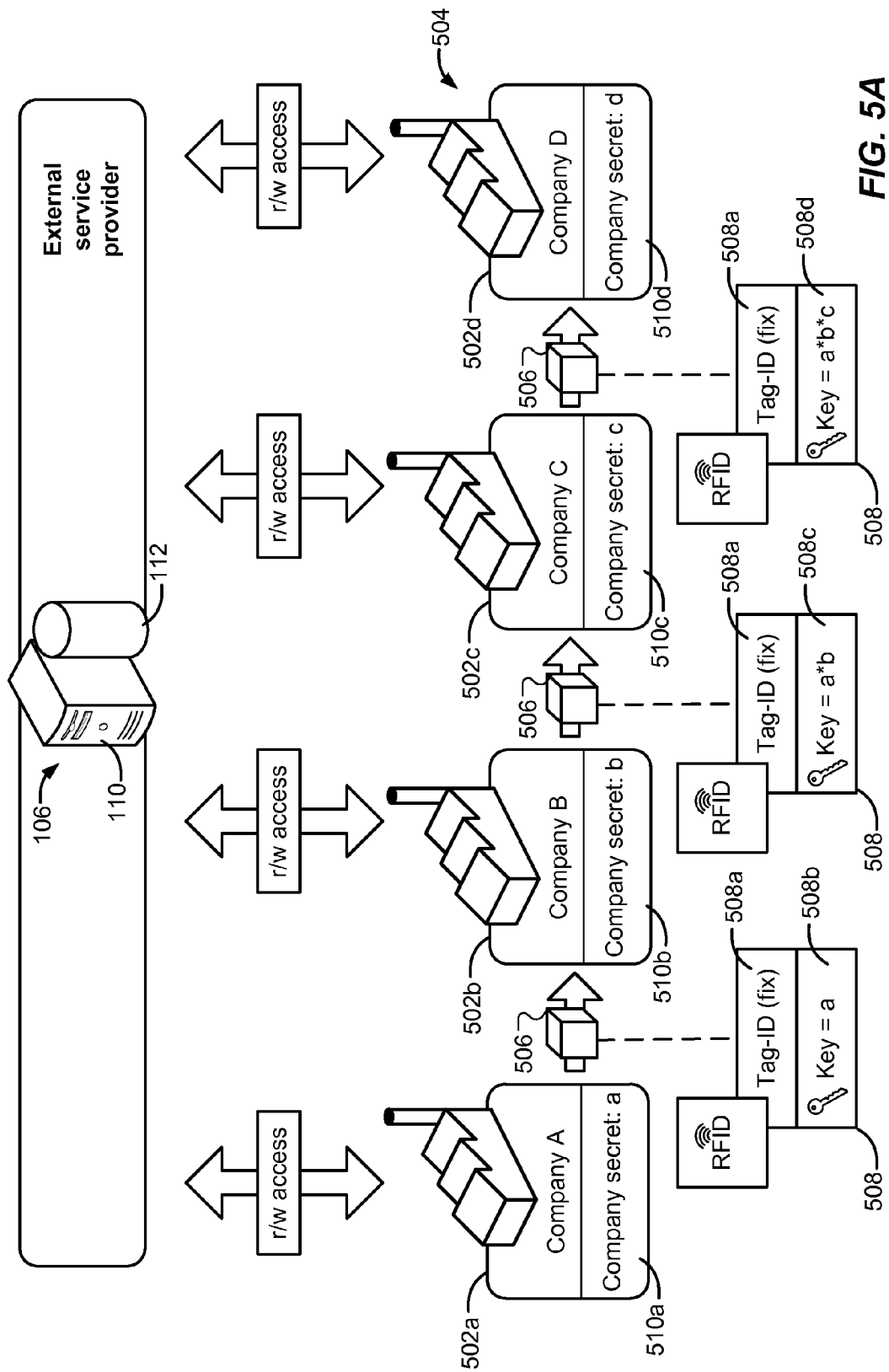
FIG. 5A is an illustration of an example data exchange between entities in a supply chain.

FIG. 5A is an illustration of an example data exchange between entities 502a-d in a supply chain 504. Each entity 502a-d performs a value added function to the product 506 in the supply chain 504. Each entity 502a-d generates and accumulates data that can be stored in (written to) the database 112 of the central computer 106 provided by an external service provider. In some implementations, the entity can encrypt the data before writing it to the database 112. The stored data can be passed from one entity to its successor entity as the product 506 makes its way through the supply chain 504. The successor entity can read the data stored by the entity in the database 112. An RFID tag 508 is attached to the product 506. The product 506, with the attached RFID tag 508, can be passed from one entity to another along the supply chain 504.

An enterprise using the supply chain 504 in FIG. 5A can utilize a symmetric cryptosystem to manage the passing of data between entities 502a-d included in the supply chain 504. The symmetric cryptosystem can use an encryption function $f_{enc}$ and a decryption function $f_{dec}$ that are identical. Both the encryption function $f_{enc}$ and the decryption function $f_{dec}$ can be implemented using a bitwise exclusive OR (XOR) operation. Each of the entities 502a-d is in possession of a company secret 510a-d, respectively. Each company secret 510a-d is known only to the respective entity 502a-d and may not vary. The multiplicative product of the company secrets 510a-d can be used to generate a symmetric key $k_j$. For example, a company secret can be a large prime number. The multiplicative product of prime numbers results in a number that can be difficult to factorize making it difficult for a third party not included in the supply chain 504 to determine the key $k_j$. In the example of FIG. 5A, the key $k_j$ is the multiplicative product of the company secrets of all entities that have been involved in the manufacturing process for a given product in the supply chain 504 up to a given point in the supply chain 504. As a result, the key $k_j$ will change for each entity in the supply chain. The symmetric key $k_j$ can be generated at each step j in the supply chain 504 for each entity 508a-d in the supply chain 504. The key $k_j$ is the multiplicative product of two existing parameters, the previous key $k_{j-1}$ and the current company secret $s_i$. For example, $k_j=(k_{j-1})*(s_i)$.

An entity can generate a reference rowID$_j$ using the reference function $f_{ref}$. For example, the reference function $f_{ref}$ can be a bitwise XOR and a hash function. In some implementations, the key $k_j$ and the tag ID can be the parameters used by the reference function $f_{ref}$ to generate the reference rowID$_j$. In some implementations, the key $k_j$, the tag ID and a timestamp can be the parameters used by the reference function $f_{ref}$ to generate the reference rowID$_j$. The RFID tag 508 can store the parameters (e.g., the tag ID, the key $k_j$, and the timestamp) the for use by the entities 508a-d in the supply chain 504. For example, when the key $k_j$ and the tag ID are the parameters used by the reference function $f_{ref}$ to generate the reference rowID$_j$, rowID$_j$=$f_{ref}$(id; $k_j$)=h(id$\oplus k_j$) where h is a hash function. The hash function h can take as an input an arbitrary numerical value of any length and generate a hash value with a fixed length. For example, the hash function h is a one-way function such that given a value x' it can be difficult to find a value x such that x'=h(x). The hash function h is a function that when given a value x, it can be difficult to find a value y such that h(x)=h(y). The tag ID can uniquely identify an RFID tag (e.g., tag ID 508a uniquely identifies RFID tag 508).

Referring to FIG. 5A, an enterprise can initially write the tag ID 508a once on the RFID tag 508 before the start of the manufacturing process performed by the supply chain 504. The tag ID 508a can then be a fixed, read-only entry on the RFID tag 508 that the entities (e.g., entities 502a-d) in the supply chain 504 can read. A key $k_j$ can be stored on the RFID tag 508 in a read/write format where the entities (e.g., entities 502a-d) in the supply chain 504 can read or write the key $k_j$.

For example, an entity can write a new key on the RFID tag 508 that its successor entity can read.

Referring again to FIG. 5A, entity 502a is at the start of the supply chain 504. A data exchange process between entity 502b and 502c can occur when entity 502c, further into the supply chain 504, receives the product 506 that includes the RFID tag 508 from its predecessor entity 502b. The entity 502b accumulates data during a value added manufacturing step performed by the entity 502b.

The entity 502b generates a key and writes the key (e.g., key 508c) on the RFID tag 508, updating the key entry on the RFID tag 508 from its previous value (key 508b) to its new value (key 508c). The entity 502b performs the key generation by determining the multiplicative product of the company secrets of its predecessors with its own company secret (e.g., (a*b)).

The entity 502b encrypts the data using key 508c that the entity 502b generated and wrote to the RFID tag 508.). The entity 502b calculates the reference rowID$_B$ using a function $f_{ref}$ that links the tag ID 508a with the key 508c. The entity 502b stores the encrypted data in the database 112 at the reference rowID$_B$ (the reference row ID for the data stored by entity 502b (company B) in the supply chain 504). The entity 502c next acquires and decrypts the data from the database 112 previously stored by the entity 502b.

Figure 5B:
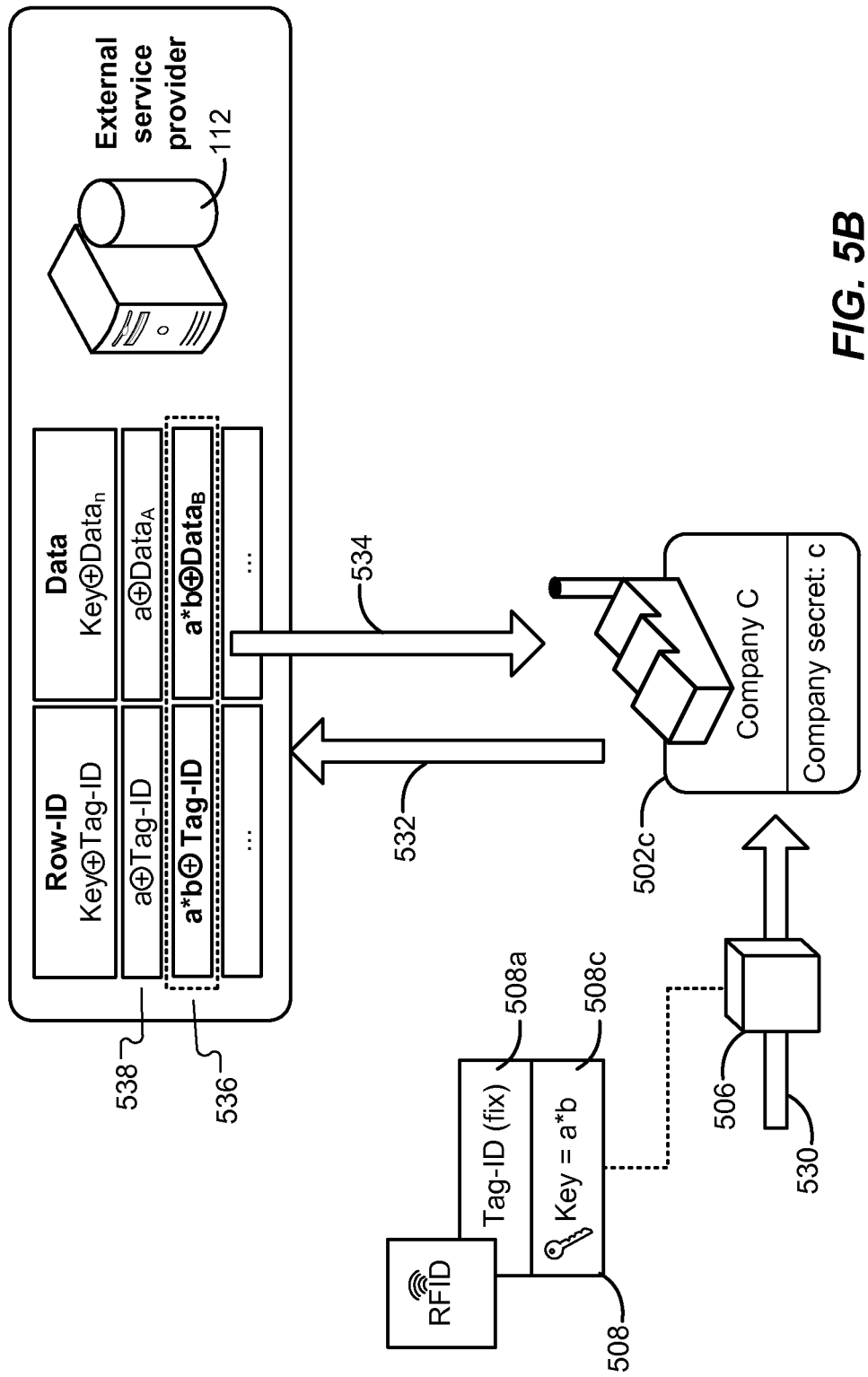
FIG. 5B is a diagram showing an entity acquiring and decrypting previously stored data.

FIG. 5B is a diagram showing entity 502c acquiring and decrypting previously stored data. Entity 502c reads the information stored on the RFID tag 508 (e.g. the tag ID 508a and the key 508c) (530). Using the information read from the RFID tag 508, the entity 502c determines the reference to the row in the database 112, reference rowID$_B$, where the data stored by entity 502b is located. The entity 502c determines the reference rowID$_B$ by linking the key 508c (a*b) with the tag ID 508a using a reversible function (e.g., a bitwise XOR operation ((a*b)⊕(tag ID))). Using the reference rowID$_B$, the entity 502c queries the database 112 of the external service provider (532) and acquires the encrypted data stored by the entity 502b (534). The entity 502c uses the key 508c (a*b) read from the RFID tag 508 to decrypt the data ((a*b)⊕(DATA$_B$)).

In the example shown in FIG. 5B, entity 502c can acquire the encrypted data stored by entity 502b by accessing row 536 in the database 112 dedicated to the storage of the data. The entity 502c may not access the encrypted data stored in row 538. Entity 502a wrote the encrypted data in row 538 where the data in row 538 may not be accessed by entity 502c. The encrypted data in row 538 can be access by entities 502a and 502b. Entity 502b is the entity in the supply chain 504 that knows the key for the data stored by entity 502a. Additionally, the storing of encrypted data in the database 112 can preclude the service provider from reading the data, as the service provider does not know how to decrypt the encrypted data.

Figure 5C:
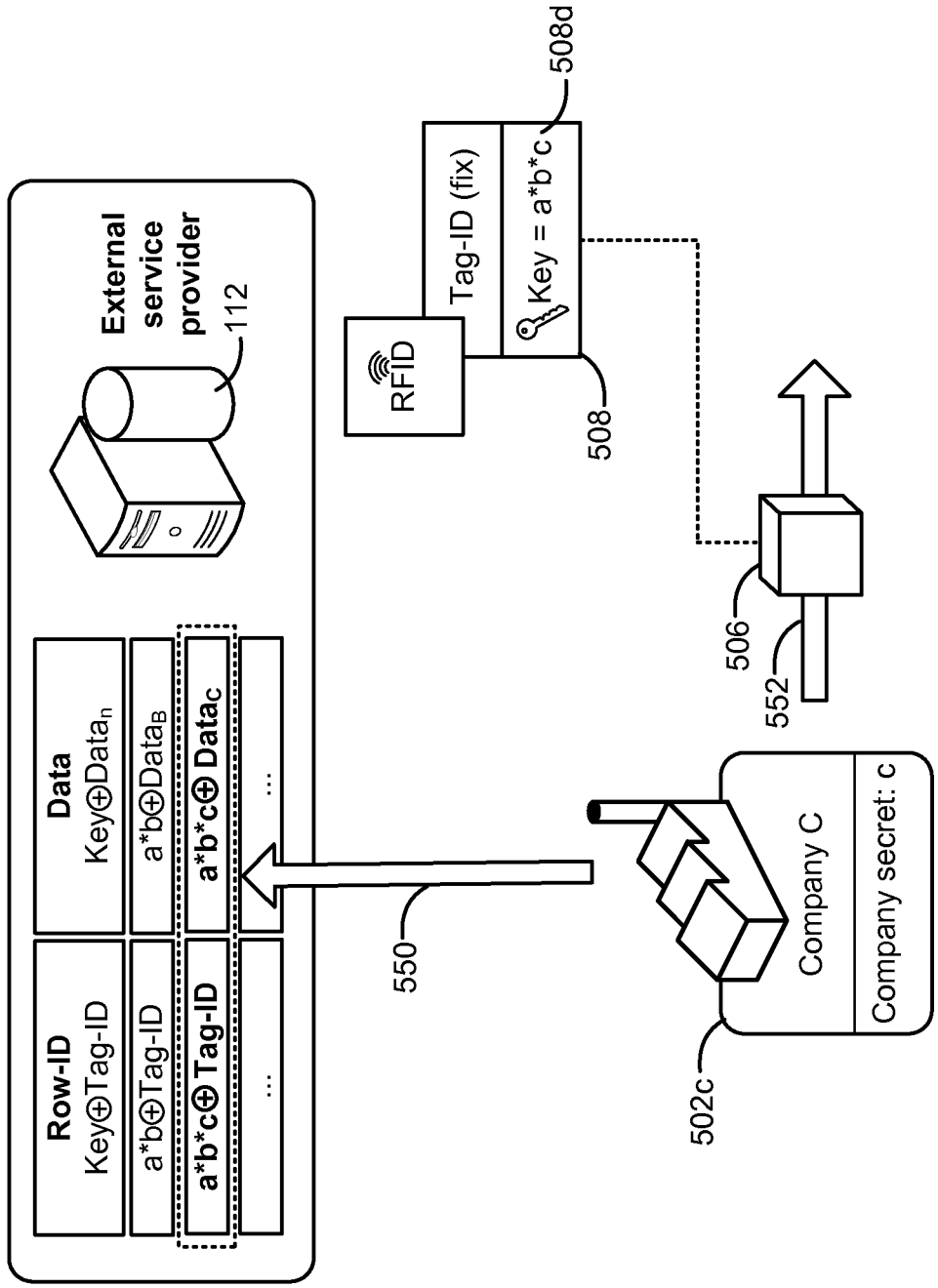
FIG. 5C is a diagram showing the generating of a key by an entity.

FIG. 5C is a diagram showing the generating of a key by an entity 502c. Continuing down the supply chain 504, entity 502c further process the product 506 by performing a value added manufacturing step to the product 506 and, in some cases, uses the data provided by entity 502b. Entity 502c accumulates data during the value added manufacturing step the entity 502c performs.

Entity 502c generates a key and writes the key (e.g., key 508d) on the RFID tag 508, updating the key entry on the RFID tag 508 from its previous value (key 508c) to its new value (key 508d). The entity 502c performs the key generation by determining the multiplicative product of the company secrets of its predecessors with its own company secret (e.g., (a*b*c)). The entity 502c can also perform the key generation by determining the multiplicative product of the previous key (e.g., (a*b)), the key generated by entity 502b and written on the RFID tag 508, with the company secret (c) of the entity 502c (e.g., (a*b*c)).

The entity 502c encrypts the accumulated data using key 508d that the entity 502c generated and wrote to the RFID tag 508 (e.g., the data is encrypted as (a*b*c) (DATA$_C$)). The entity 502c stores the encrypted data in the database 112 at a reference rowID$_C$ (the reference row ID for the data stored by entity 502c (company C) in the supply chain 504) (550). The entity 502c calculates the reference rowID$_C$ using a function $f_{ref}$ that links the tag ID 508a with the key 508d (e.g., the reference rowID$_C$ is calculated as (a*b*c)⊕(tag ID)). The entity 502c writes the key 508d on the RFID tag 508 (552). Entity 502c can now pass the product 506 to entity 508d.

As shown in FIGS. 5B and 5C, the database 112 can consist of two columns. A rowID column can include the reference rowID$_j$ to the encrypted data. A data column can include the stored encrypted data. In some implementations, the stored encrypted data can be split into equal blocks and stored in multiple rows with the same reference and sequence number. In some implementations, an index of the rowID column in a single table can be generated to speed up the retrieval of the stored data. In some implementations, multiple tables can be organized as a search tree to speed up the retrieval of the stored data. In some implementations, in order to share the load of a single database, a continuously synchronized distributed database system can be setup where each entity holds a local copy of the master database.

In some implementations, a common structure can be used for the stored data. The use of a common structure allows each of the entities in the supply chain to understand the stored data. An enterprise may share historical data along the supply chain.

In some implementations, historical data can be concatenated with accumulated shared data at each step in the supply chain. This can result in redundancies and increased use of storage space in the database. In some implementations, a reference and key can be attached to the accumulated data in order to retrieve the historical data. This would allow every entity in the supply chain to access the historical data. In some implementations, the database includes an additional table that includes the historical data and is public to each entity in the supply chain. The historical data can be stored unencrypted and the historical data can be retrieved using the reference rowID of the RFID tag.

In some implementations, a supply chain can assemble a product using multiple different parts or sub-products. Each part can have its own RFID tag and several different suppliers can deliver each part. When reading RFID tags, an entity reads the RFID tags of the sub-products. The new product, composed of the sub-products, receives its own RFID tag. When writing an RFID tag, the entity can delete the content of the RFID tags of the sub-products used to assemble the new product in order to prevent successor entities in the supply chain from accessing the data. Additionally, the entity can append the tag IDs of the sub-products to the data on the RFID tag of the new product. The assembling entity and successive entities in the supply chain can determine the sub-products included in the new product by reading the tag IDs of the sub-products from the RFID tag for the new product.

In some implementations, multiple parts of the same tagged batch are used in multiple products. For example, for some products (e.g., a liquid or gas) it is not possible to attach an RFID tag to the product due to their physical condition. For example, the product can be packaged in a container with an RFID tag attached to the container. An entity receives the container, reads the data on the RFID tag attached to the container, and uses the contained product to build a new product. The entity can append the tag ID of the product used to build the new product to the RFID tag attached to the new product. The assembling entity knows the tag ID of the products and components used in the assembly of the new product. The successor entity can know the tag ID of the new product but may not access the data of the individual products used to assembly the new product.

In some implementations, an enterprise can use the tag ID of a final product to identify the product. The tag ID can be supplied to each of the entities included in the supply chain. This can be beneficial when performing a product tracing or recall.

Figure 6:
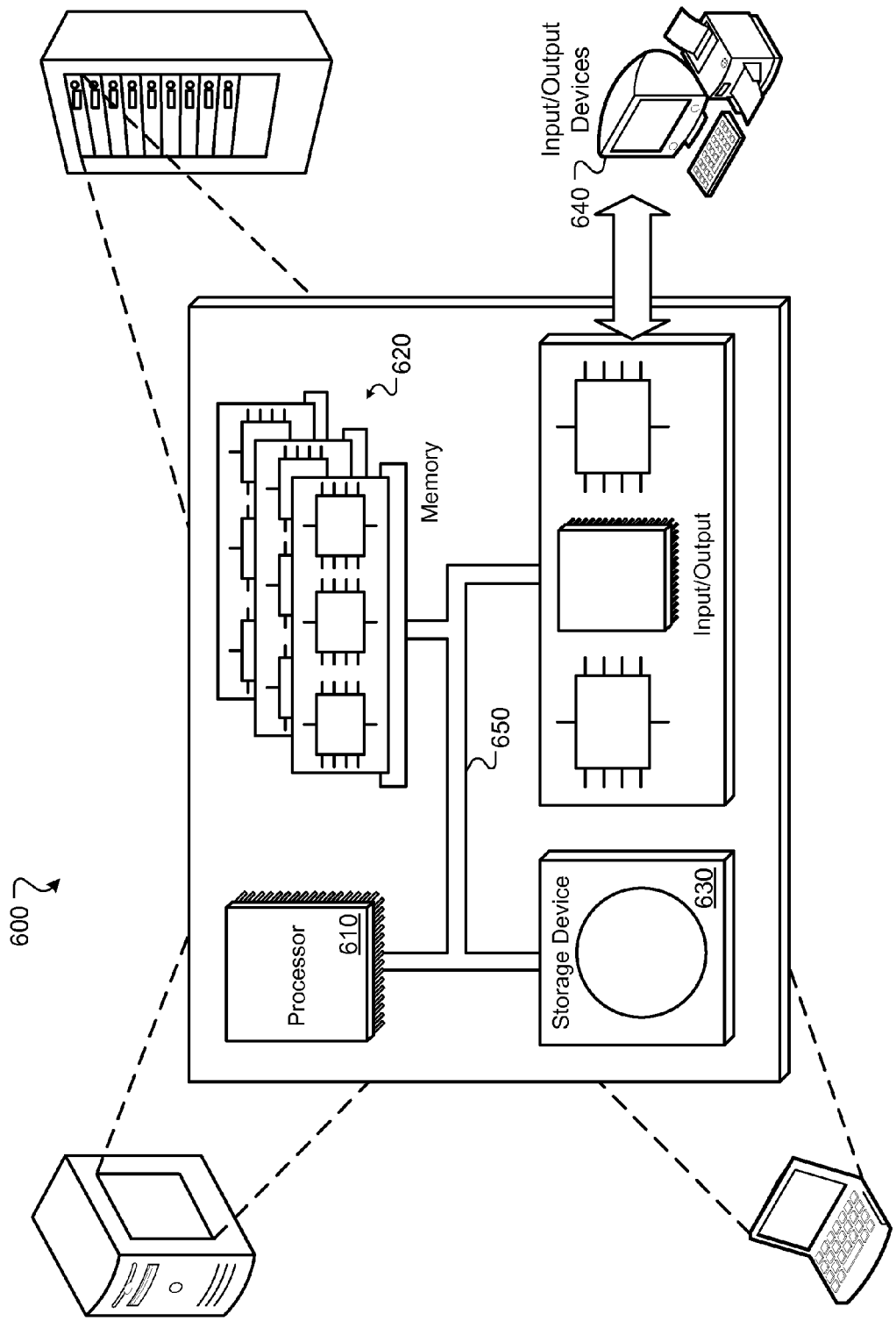
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method of sharing data in a supply chain, the data corresponding to an item having a tag associated therewith, the method comprising:

generating data comprising historical data associated with the item, the historical data being accumulated and passed on from partner to partner in the supply chain;

generating a data reference;
encrypting the data using an encryption key to provide encrypted data;
transmitting the encrypted data over a network for storage at a location in a database based on the data reference;
writing the data reference and the encryption key to the tag, the encrypted data being absent from the tag; and
transferring the item to a successor in the supply chain.

2. The method of claim 1, wherein generating a data reference comprises linking the encryption key and a tag ID using a reference function.

3. The method of claim 2, wherein generating a data reference further comprises linking a timestamp with the encryption key and the tag ID.

4. The method of claim 1, further comprising:
accessing encrypted data stored in the database; and
decrypting the encrypted data using a decryption key.

5. The method of claim 4, wherein the encryption key is the same as the decryption key.

6. The method of claim 1, wherein writing comprises replacing a previous encryption key with the encryption key.

7. The method of claim 1, wherein writing comprises replacing a previous data reference with the data reference.

8. The method of claim 1, further comprising:
receiving the item from a predecessor in the supply chain;
retrieving information electronically stored on the tag, the information comprising a previous data reference and a previous encryption key;
determining the location of previous encrypted data in the database based on the previous data reference;
transmitting a data request over the network for retrieving the previous encrypted data from the determined location in the database, the data request comprising the previous data reference;
receiving the previous encrypted data from the database;
decrypting the previous encrypted data using the previous encryption key to provide decrypted data; and
adding data associated with a second supply chain process of the item to the decrypted data.

9. A computer-implemented method of sharing data in a supply chain, the data corresponding to an item having a tag associated therewith, the method comprising:
retrieving information electronically stored on the tag, the information comprising a data reference and an encryption key;
transmitting a data request over a network for retrieving encrypted data from a database, the data request comprising the data reference;
receiving the encrypted data from the database, the encrypted data being absent from the tag and comprising historical data associated with the item, the historical data being accumulated and passed on from partner to partner in the supply chain; and
decrypting the encrypted data using the encryption key to provide decrypted data.

10. The method of claim 9, further comprising:
generating additional data corresponding to the item;
appending the additional data to the decrypted data to provide updated data;
generating a second data reference;
encrypting the updated data using a second encryption key to provide second encrypted data;
transmitting the second encrypted data over the network for storage in the database based on the second data reference;
writing the second data reference and the second encryption key to the tag; and
transferring the item to a successor in the supply chain.

11. The method of claim 10, wherein generating a data reference comprises linking the encryption key and a tag ID using a reference function.

12. The method of claim 11, wherein generating a data reference further comprises linking a timestamp with the encryption key and the tag ID.

13. The method of claim 10, further comprising:
accessing encrypted data stored in the database; and
decrypting the encrypted data using a decryption key.

14. The method of claim 13, wherein the encryption key is the same as the decryption key.

15. The method of claim 10, wherein writing comprises replacing a previous encryption key with the encryption key.

16. The method of claim 10, wherein writing comprises replacing a previous data reference with the data reference.

17. A non-transitory computer-readable storage medium coupled to one or more processors having instructions stored thereon which, when executed by the one or more processors, cause the one or more processors to perform operations for sharing data in a supply chain, the data corresponding to an item having a tag associated therewith, the operations comprising:
retrieving information electronically stored on the tag, the information comprising a data reference and an encryption key;
transmitting a data request over a network for retrieving encrypted data from a database, the data request comprising the data reference;
receiving the encrypted data from the database, the encrypted data being absent from the tag and comprising historical data associated with the item, the historical data being accumulated and passed on from partner to partner in the supply chain; and
decrypting the encrypted data using the encryption key to provide decrypted data.

18. The computer-readable storage medium of claim 17, wherein the operations further comprise:
generating additional data corresponding to the item;
appending the additional data to the decrypted data to provide updated data;
generating a second data reference;
encrypting the updated data using a second encryption key to provide second encrypted data;
transmitting the second encrypted data over the network for storage in the database based on the second data reference; and
writing the second data reference and the second encryption key to the tag before the item is transferred to a successor in the supply chain.

* * * * *